(12) United States Patent
Woodward et al.

(10) Patent No.: US 10,267,695 B2
(45) Date of Patent: Apr. 23, 2019

(54) SERVO ELECTRIC PRESS 2-STAGE FORCE

(71) Applicant: Syneo, LLC, West Palm Beach, FL (US)

(72) Inventors: Daniel A. Woodward, West Palm Beach, FL (US); Edward Ethen, West Palm Beach, FL (US)

(73) Assignee: Syneo, LLC, West Palm Beach, FL (US)

( * ) Notice: Subject to any disclaimer, the term of this patent is extended or adjusted under 35 U.S.C. 154(b) by 266 days.

(21) Appl. No.: 15/458,533

(22) Filed: Mar. 14, 2017

(65) Prior Publication Data

US 2017/0268947 A1    Sep. 21, 2017

Related U.S. Application Data

(60) Provisional application No. 62/308,309, filed on Mar. 15, 2016.

(51) Int. Cl.
*G01L 1/26* (2006.01)
*G01L 5/00* (2006.01)

(52) U.S. Cl.
CPC .............. *G01L 5/0076* (2013.01); *G01L 1/26* (2013.01)

(58) Field of Classification Search
CPC ................. G01L 5/0076; G01L 1/26
See application file for complete search history.

(56) References Cited

U.S. PATENT DOCUMENTS

2016/0377518 A1\* 12/2016 Puchnin ............ G01B 7/26
73/12.09

\* cited by examiner

*Primary Examiner* — Jonathan M Dunlap
(74) *Attorney, Agent, or Firm* — McHale & Slavin, P.A.

(57) ABSTRACT

A 2-stage force measuring system particularly useful for a high capacity press. A first stage load cell provides a high force range for measurements over 1,000 lbs. A second stage load cell is for measurements below 1,000 lbs. The assembly improves sensitivity and reduces noise by a factor of 16 (16,000 pounds/1,000 pounds) when pressing less than 1,000 pounds. If a press cycle exceeds 1,000 pounds, the force monitor will automatically and seamlessly transition from the low range load cell to the high range load cell. If the force required is less than 1,000 pounds, only the low range load cell will detect the load, providing a dramatic improvement in force resolution and accuracy.

10 Claims, 2 Drawing Sheets

SERVO ELECTRIC PRESS 2-STAGE FORCE

PRIORITY CLAIM

In accordance with 37 C.F.R. § 1.76, a claim of priority is included in an Application Data Sheet filed concurrently herewith. Accordingly, the present invention claims priority to U.S. Provisional Patent Application No. 62/308,309, entitled "SERVO ELECTRIC PRESS 2-STAGE FORCE", filed Mar. 15, 2016. The contents of which the above referenced application is incorporated herein by reference in its entirety.

FIELD OF THE INVENTION

This invention is directed to the field of load cell measuring and, in particular, to an improved load cell having 2 stages.

BACKGROUND OF THE INVENTION

Presses are used in a huge variety of applications across many industries. Typically, the primary function of the press is to apply a force to achieve a result. Some examples include assembling components together by forcing one into another or deforming a material to match the shape of a die or mold. Sometimes, the pressing force must be accurately monitored over a large range of force, such as from zero to 25,000 pounds. This invention relates to force monitoring during the pressing process, and the device disclosed applies equally to presses applying force using servo electric, hydraulic, and pneumatic force generation.

Feedback from a force transducer (e.g. a strain gage based load cell) is typically analog in nature and must be converted to digital in order to be read by a digital computer. The voltage range is typically 0-10 volts for forces from 0 pounds to the maximum force rating of the load cell. The higher the force rating of the load cell, the lower the resolution (force granularity) becomes. As a result of this granularity, precision is lost when pressing in a lower force range.

In any load cell application, the force resolution and accuracy is directly proportional to the maximum force the load cell can measure. Thus, lower ultimate force will always result in better resolution and accuracy. Electrical noise on the A/D circuit (there will always be at least a few millivolts of noise) produces an apparent force proportional to the maximum load cell capacity. Additionally, resolution equals the maximum load cell force divided by the A/D resolution. Higher ultimate force results in more coarse force resolution.

The present invention overcomes this drawback by employing a second load cell with a lower range that works in tandem with the higher force load cell.

SUMMARY OF THE INVENTION

Disclosed is a 2-stage force measuring system which uses two load cells and A/D channel converters. One stage, termed the high force range, is where the full press force capacity is accommodated. A second stage, termed the low force range, is limited to lower forces, such as 1,000 pounds. By combining the totals, a response is provided that improves sensitivity and reduces noise by a factor of 10 (10,000 pounds/1,000 pounds). The implementation of the measurement is transparent to the user. If the press cycle exceeds 1,000 pounds, the force monitor will automatically and seamlessly transition from the low range to the high range. If the force required is less than 1,000 pounds, only the low range load cells will be used to guide the pressing process with dramatic improvement in force resolution and accuracy.

An objective of the instant invention is to provide improved low end force accuracy and repeatability of a load cell.

Still another objective of the invention is provide a load cell that will continue to accurately measure high force capacity, but provide significantly better low force accuracy.

Still another objective of the invention is to provide a load cell system that is particularly well suited for servo electric press equipment.

Another objective of the invention is to provide a transparent force monitor system wherein, if a press cycle exceeds a low force range, the force monitor will automatically and seamlessly transition from a low force range to a high force range.

Still another objective of the invention is provide a load cell wherein a user does not need to determine a load range, and programming of a press cycle will remain conventional.

Yet still another objective of the invention is to provide a load cell that improves sensitivity and reduces noise by a large factor in the low force range.

Other objectives and further advantages and benefits associated with this invention will be apparent to those skilled in the art from the description, examples and claims which follow.

DETAILED DESCRIPTION OF THE PREFERRED EMBODIMENT

Figure 1:
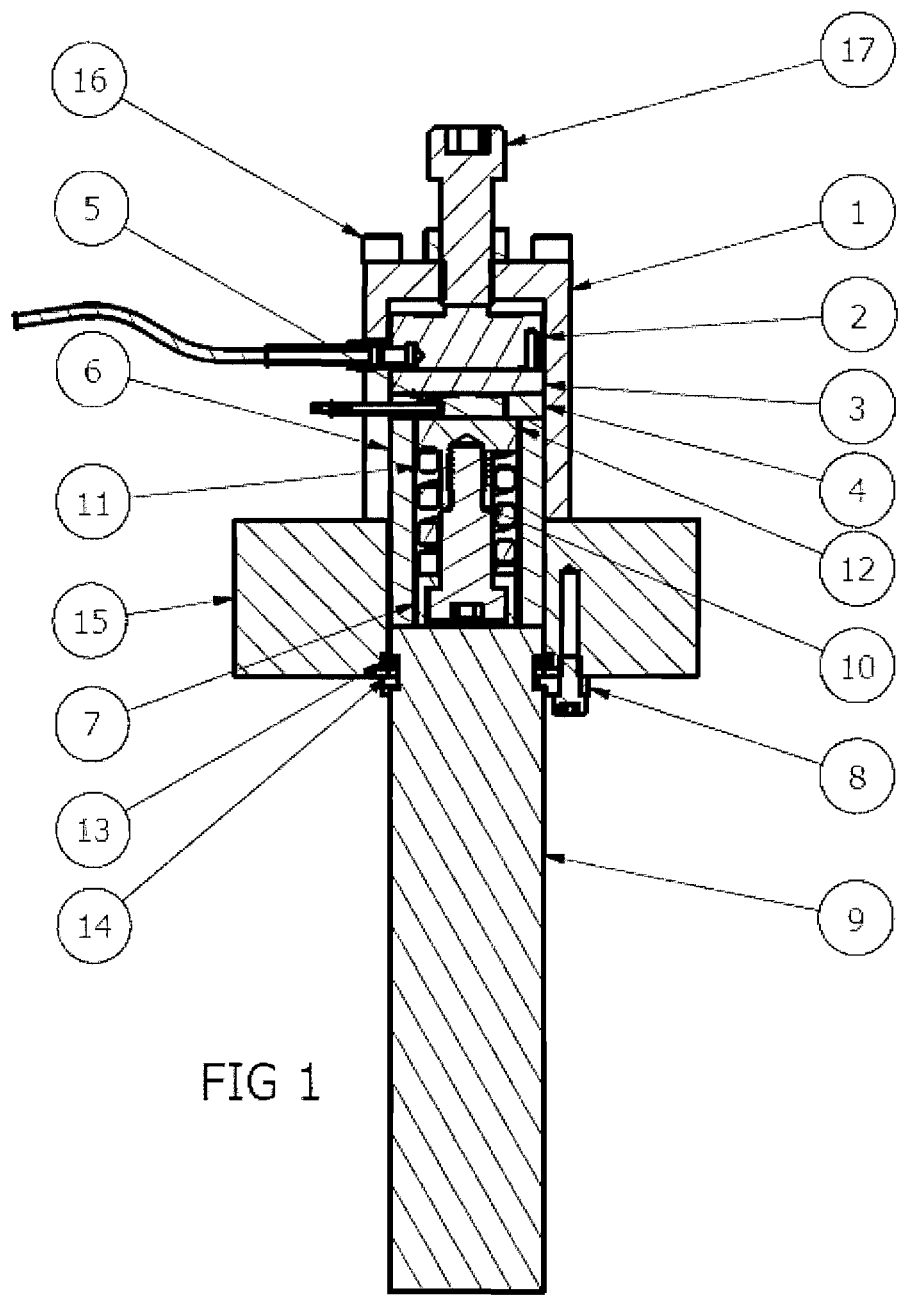
FIG. 1 is an illustrative cross sectional side view of the device.
Figure 2:
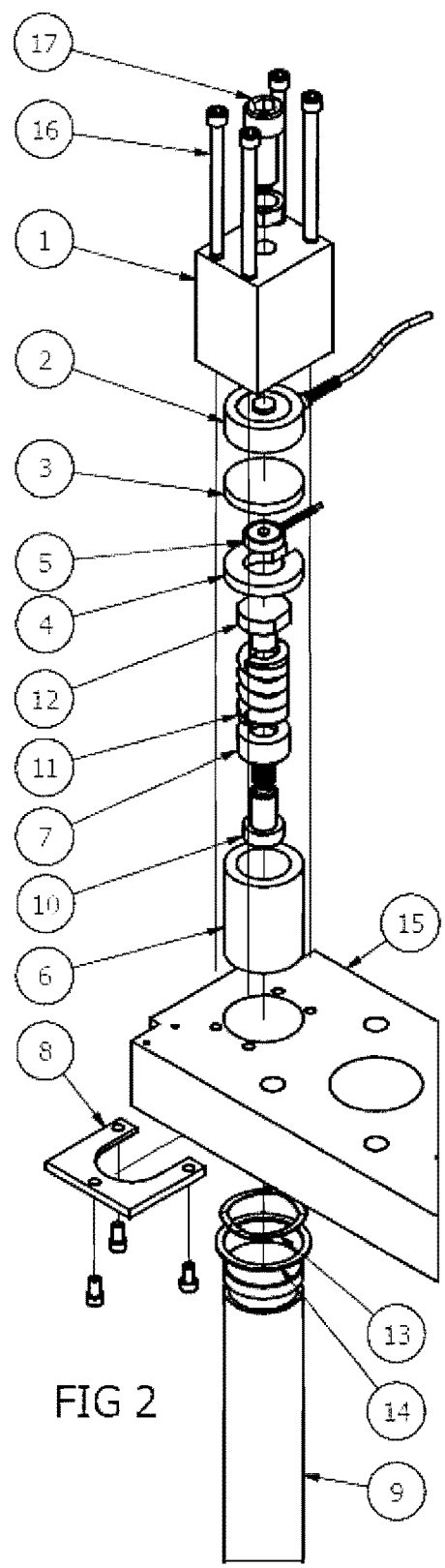
FIG. 2 is an exploded view of FIG. 1.

Detailed embodiments of the instant invention are disclosed herein, however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Servo electric presses have been in use for decades. Compared with pneumatic hydraulic presses, the servo electric press has many advantages. These advantages include precise and flexible speed control, accurate position control throughout the travel, and, when combined with force transducers, pressing force can be monitored and decisions made in real time. This invention is particularly useful in servo electric pressing equipment.

For example, a 1,000 pound rated load cell used in conjunction with a 10,000 pound load cell will give 10 times higher resolution from zero to 1,000 pounds than the 10,000 pound load cell. Combining the two ranges in the same pressing head would provide a higher precision, up to 1,000 pounds, without sacrificing maximum force capacity. If the load cells are arranged in a series configuration, where the pressing force is detected simultaneously by both load cells, the monitoring system can automatically and seamlessly use the load cell whose range is optimal for the present force. However, if the load cells are simply placed back to back, the lower force load cell will be destroyed when pressing at forces above its maximum. This condition can be avoided without sacrificing the convenience of series load cells by employing a protection device within the assembly. This is accomplished by providing a lost motion device that will bypass any force that exceeds the low range load cell capacity to the higher range load cell.

Referring to the Figures, set forth is a preferred embodiment of this protection device. Force is applied to the top of the assembly through load cell saddle (1). This force can be developed using an electric motor, a hydraulic cylinder, or a pneumatic cylinder. The output force is applied to the desired object at the opposite end by rod guide shaft (9). The high range load cell (2), in this embodiment a 10,000 lb rating, is separated from a low range load cell (5) by a spacer disk (3). Spacer disk (3) serves to distribute the force evenly to the load cell (2). Around load cell (5) is a compressible ring member 4 that is slightly less in size or thickness than the load cell (5) size or thickness. This allows the load cell (5) to be engaged upon the application of force, causing a detectible compression, according to the conventional operation of a load cell. Beneath the load cell (5) is a lost motion protection assembly (7) which presses directly on the load cell (5).

The lost motion protection assembly is adjoined by a bolt (10) having a shoulder with about a 0.75 inch long shaft for coupling to cap spring (12), positioning a steel die spring (11) using 0.5 inch rod with a length of about 1.5 inches and a center aperture of about 1 inch. A spring washer (7) is positioned between the shoulder of the bolt (10) and the steel die spring (11). The die spring (11) is preloaded (compressed) as the bolt (10) is forced upward by guide shaft (9). The steel die spring (11) is selected such that the preload matches the maximum force of the low range load cell. When a load is applied and the low range load cell force is reached (and thus the preload force is reached), the spring loaded assembly is able to compress slightly, which allows the ring (4) around the low range load cell (5) to direct all additional force around the low range load cell to the high range load cell (2). The high range load cell (2) continuously reads the force throughout the process, while the low range load cell (5) only reports up to the preload value of the spring. An overload spring (6) is positioned around the die spring (11). The guide shaft (9) is secured to the base (15) by a U-shaped retainer (8) using a spring wavy washer (13) and spring washer (14) to maintain tension on the guide shaft (9) in relation to the base (15). The spring wavy washer (13) is a biasing element constructed and arranged to provide a counter balance to the weight of the assembly. For instance, the weight of the assembly including the individual elements may be upwards to 70 lbs, which is a weight that can be detected by the load cell. The spring wavy washer (31) biasing element provides an upward lift using the guide shaft as a base so as to remove assembly weight that otherwise preloads the load cell, thereby eliminating the loading on the second stage load cell. In operation of the measuring system, the second stage load cell will not report the weight of the assembly and will allows a no load reading on the load cell during rest, futher allowing weight readings without the need to adjust for assembly weights.

The invention provides a 2-stage force measuring system, such as a 16,000 pound capacity press, but the measuring system can be scaled to any size press. The measuring system is based upon a first stage load cell (2) having a first analog to digital (A/D) channel rated for about 16,000 pound capacity and a second stage load cell (5) having a second A/D channel rated for about 1,000 pound capacity; wherein said second stage load cell provides measurement for loads from 0 to 1,000 pounds and said first stage load cell provides a measurement for loads from 1,001 to 16,000 pounds.

The first stage load cell (2) is separated from the second stage low range cell (5) by a disk, which is constructed and arranged to distribute forces evenly to the first stage load cell (2). The second stage load cell (5) includes a ring (4) that is slightly shorter than the size of the second stage load cell (5), wherein the second stage load cell (5) may compress as load is applied. The second stage load cell (5) includes the lost motion protection assembly (7), which presses directly on the second stage load cell (5). The lost motion protection assembly (7) is formed from a shoulder bolt (10) that connects an upper and a lower member of the system and is separated by a die spring (11).

The die spring (11) is preloaded in a compressed state and matches the maximum force of the low range load cell (5). When a load is applied and the low range load cell preload force is reached, the spring loaded assembly is able to compress slightly, which allows said ring member (4) around said low range load cell (5) to direct all additional force around said low range load cell (5) to the high range load cell (2). The load saddle (1) is coupled to the base (15) by a plurality of attachment bolts (16), allowing ease of assembly and replacement. Force is applied to the top of the assembly through a loading bolt (17) mounted to the load saddle (1), causing a load which, if low, is not detected on the first load cell which is rated for 10,000 lbs. The load is distributed and transferred by the ring member (4), causing a compression of the steel die spring (11). In return, the shoulder bolt (10) causes a measurement of the second load cell (5) is a subminiature load cell button rated at 500 lbs. Readings for the low pressures are measured from the second load cell (5). If the pressure is greater, the spring (11) is compressed, as is the ring member (4) for the load cell (5) causing operation of the high load cell (2); each load cell converting from an analog signal to a digital signal.

It is noted that the specific forces referenced, i.e. 16,000 lbs, 10,000 lbs, 1,000 lbs, 70 lbs are the preferred or exemplary embodiments. The specific forces can be changed to meet a particular application, the teaching of this invention is directed to the two stage measurement system.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A 2-stage force measuring system for a high capacity press, said measuring system comprising:
   a first stage load cell having a first A/D channel rated for high capacity;
   a second stage load cell having a second A/D channel rated for low capacity;

a compressible ring member positioned around said second stage load cell constructed and arranged to allow compression of said second stage load cell and provide a separation with said first load cell;

a lost motion protection assembly constructed and arranged to bypass any force that exceeds said second stage load cell and measure said pressure from said first stage load cell;

whereby said second stage provides a measurement for low capacity loads and said first stage provides a measurement for high capacity loads.

2. The 2-stage force measuring system according to claim 1 wherein said compressible ring member is less in size than the size of said second stage load cell, wherein said second stage load cell is compressed when a load is applied that exceeds 1,000 lbs.

3. The 2-stage force measuring system according to claim 1 wherein said lost motion protection assembly presses directly on second stage load cell, said lost motion protection assembly including a compressible spring that allows transfer of high pressures to said first stage load cell.

4. The 2-stage force measuring system according to claim 3 wherein said spring is preloaded by placement in a compressed state, said spring compressed at a rate to transfer all pressures to said first stage load cell.

5. The 2-stage force measuring system according to claim 4 wherein, when a load is applied and the low range load cell preload force is reached, the spring loaded assembly is able to compress slightly, which allows said ring around said low range load cell to direct all additional force around said low range load cell to the high range load cell.

6. The 2-stage force measuring system according to claim 1 wherein said first stage load cell is rated for about 10,000 lbs., and said second stage load cell is rated for about 1,000 lbs.

7. The 2-stage force measuring system according to claim 1 wherein said first stage load cell is rated for about 16,000 lbs., and said second stage load cell is rated for about 1,000 lbs.

8. The 2-stage force measuring system according to claim 1 including biasing element constructed and arranged to counter system weight wherein said second stage load cell will not detect a weight in a non-measurement situation.

9. The 2-stage force measuring system according to claim 8 wherein said biasing element is a wavy spring.

10. The 2-stage force measuring system according to claim 8 wherein said biasing is sized to counter a 70 lb load.

\* \* \* \* \*